United States Patent [19]

Artus et al.

[11] Patent Number: 4,990,809
[45] Date of Patent: Feb. 5, 1991

[54] VARIABLE RELUCTANCE MOTOR

[75] Inventors: Richard J. Artus, Bristol; Anthony E. Balestro, Avon; Allen R. Perrins, Branford; Peter Senak, Jr., Bristol, all of Conn.

[73] Assignee: The Superior Electric Company, Bristol, Conn.

[21] Appl. No.: 43,092

[22] Filed: Apr. 27, 1987

[51] Int. Cl.⁵ .............................................. H02K 1/14
[52] U.S. Cl. .................................. 310/192; 310/254; 310/217; 310/259
[58] Field of Search ................. 310/190, 191, 192, 89, 310/168, 254, 256, 269, 259, 217, 216, 42

[56] References Cited

U.S. PATENT DOCUMENTS

| | | | |
|---|---|---|---|
| 2,774,000 | 12/1956 | Ross | 310/216 |
| 3,421,033 | 1/1969 | Hoffmeyer | 310/192 |
| 3,445,702 | 5/1969 | Silva | 310/192 X |
| 3,549,926 | 12/1970 | Pentland | 310/194 |
| 3,568,118 | 3/1971 | Kuriyama et al. | 336/197 |
| 4,288,709 | 9/1981 | Matthias | 310/266 X |
| 4,315,171 | 2/1982 | Schaeffer | 310/49 |
| 4,475,051 | 10/1984 | Chai | 310/49 |
| 4,578,852 | 4/1986 | Sauerwein et al. | 310/217 |
| 4,602,423 | 7/1986 | Ulrich et al. | 310/43 |
| 4,672,252 | 6/1987 | Spirk | 310/216 |
| 4,729,160 | 3/1988 | Brown | 310/271 |

OTHER PUBLICATIONS

*Engineering Electromagnetics* by William H. Hayt, Jr., Dec. 1981, p. 324.

Primary Examiner—Steven L. Stephan
Assistant Examiner—Judson H. Jones
Attorney, Agent, or Firm—McCormick, Paulding & Huber

[57] ABSTRACT

A high torque-to-low mass variable reluctance motor includes a cylindrical stator assembly having a plurality of stator segments circumaxially arranged about a rotor wherein adjacent stator segments are maintained in a spaced apart relation with one another by non-magnetic pins which provide a radially inwardly projecting channel extending fully from the outer circumference to the inner circumference of the stator assembly to essentially magnetically isolate the stator segments from one another. A generally annular, non-magnetic shell coaxially surrounds and engages the outer periphery of the circular stator assembly to cause a compressive force to be directed radially inwardly to maintain the stator segments in a precisely aligned arrangement.

13 Claims, 2 Drawing Sheets

VARIABLE RELUCTANCE MOTOR

BACKGROUND OF THE INVENTION

The present invention relates generally to electric motors and deals more specifically with a high torque variable reluctance motor.

Variable reluctance motors of the type in which a variable reluctance member or rotor is rotatably stepped relative to a stator member by magnetic flux are generally well known in the art. The operation of a typical variable reluctance motor is described in U.S. Pat. No. 3,984,711 issued Oct. 5, 1976 to Kordik. One problem generally associated with variable reluctance motors is that magnetic flux produced in a stator member by the excitation of electrical windings wound around the stator members tends to leak between adjacent and simultaneously excited stator members. This flux leakage between adjacent stator members causes more flux to be effectively used in rotating the rotor to and holding the rotor in a stop or detent position when the motor is used as a stepping motor. Consequently, to overcome the effect of leakage flux more current is required to generate the torque necessary to rotate the rotor and/or to hold the rotor in its stop position. Accordingly, variable reluctance motors generally require a heavier mass for a given torque to dissipate heat generated by the additional power consumption necessary to produce the desired motor torque characteristic.

Variable reluctance motors having a high mass-to-torque ratio are generally undesirable in many applications, such as, for example, robotics wherein the motor is required to lift itself in addition to a robotic arm in which the motor is located. There have been a number of approaches to improve the operational efficiency and increase the torque of variable reluctance motors by confining the magnetic flux produced to a more effective flux path so that the torque of a motor is greater for a given amount of current applied to the windings. Kordik locates permanent magnets between adjacent stator winding pole members to confine the winding created flux to a more effective path.

U.S. Pat. No. 4,475,051 issued Oct. 2, 1984 to Chai attempts to improve the efficiency and increase the torque of a variable reluctance motor by confining the flux generated to a shorter magnetic path. Chai provides recesses in the periphery of the stator assembly which are aligned in the lateral center of the non-winding pole members to restrict the available stator iron through which the magnetic flux passes from the non-winding pole member to the winding pole member. Since a non-winding pole member is shared by two adjacent winding pole members leakage flux from one phase subtracts from the flux produced in the stator of an adjacent phase and which leakage flux results in a reduction in torque.

It is advantageous to use a grain oriented magnetic material for the stator assembly of a variable reluctance motor for increased permeability and lower losses which heretofore has not been possible with variable reluctance motors having a continuous magnetically linked stator assembly.

It is an object of the present invention therefore to provide a variable reluctance motor that has a high torque-to-mass ratio which overcomes the disadvantages associated with known variable reluctance motors.

It is a further object of the present invention to provide a variable reluctance motor that magnetically isolates adjacent stator members from one another to prevent flux leakage between the adjacent stator members.

It is yet a further object of the present invention to provide a variable reluctance motor that is less costly and easily manufactured.

SUMMARY OF THE INVENTION

In accordance with the present invention, a variable reluctance motor includes a cylindrical stator assembly comprised of a plurality of stator segments circumaxially arranged about the rotation axis of a rotor. Each of the segments includes a winding salient pole member and a non-winding salient pole member laterally located at each side and in spaced relation with the winding pole member. Non-magnetic spacing pins are located between adjacent stator segments to maintain adjacent stator segments in spaced apart relation with one another and provide a radially inwardly projecting channel extending fully from the outer circumference to the inner circumference of the stator assembly to completely magnetically isolate the stator segments from one another. In one embodiment of the invention, a generally annular, non-magnetic shell coaxially surrounds and engages the outer periphery of the assembled stator segments to cause a compressive force to be directed radially inwardly to maintain the stator segments in a cylindrical and precisely aligned spaced-apart arrangement.

In another embodiment of the invention, the stator segments are maintained in a cylindrical and precisely aligned, spaced-apart arrangement by interlocking complementary tabs extending generally laterally from each outwardly facing surface forming one side of the channel. Non-magnetic pins or dowels are received by the tabs to bring them into interlocking engagement while maintaining a radially inwardly projecting channel extending fully from the outer circumference to the inner circumference of the stator assembly to essentially magnetically isolate the stator segments from one another.

A further aspect of the invention contributing to the lower mass of the motor is the width of the back iron or magnetic material of each stator segment is one-half the width of the winding pole member. The magnetic flux produced in the winding pole member divides evenly into two series paths flowing from the winding pole member to the rotor to the non-winding pole member to the back iron of the stator segment and back to the winding pole member. The reduction in the mass of magnetic material in the variable reluctance motor is due in part to the complete magnetic isolation between adjacent stator segments which isolation permits an efficient magnetic flux path.

BRIEF DESCRIPTION OF THE DRAWINGS

Other features and advantages of the present invention will become readily apparent from the following description and claims taken in conjunction with the drawings wherein:

DETAILED DESCRIPTION OF THE PREFERRED EMBODIMENTS

Figure 1:
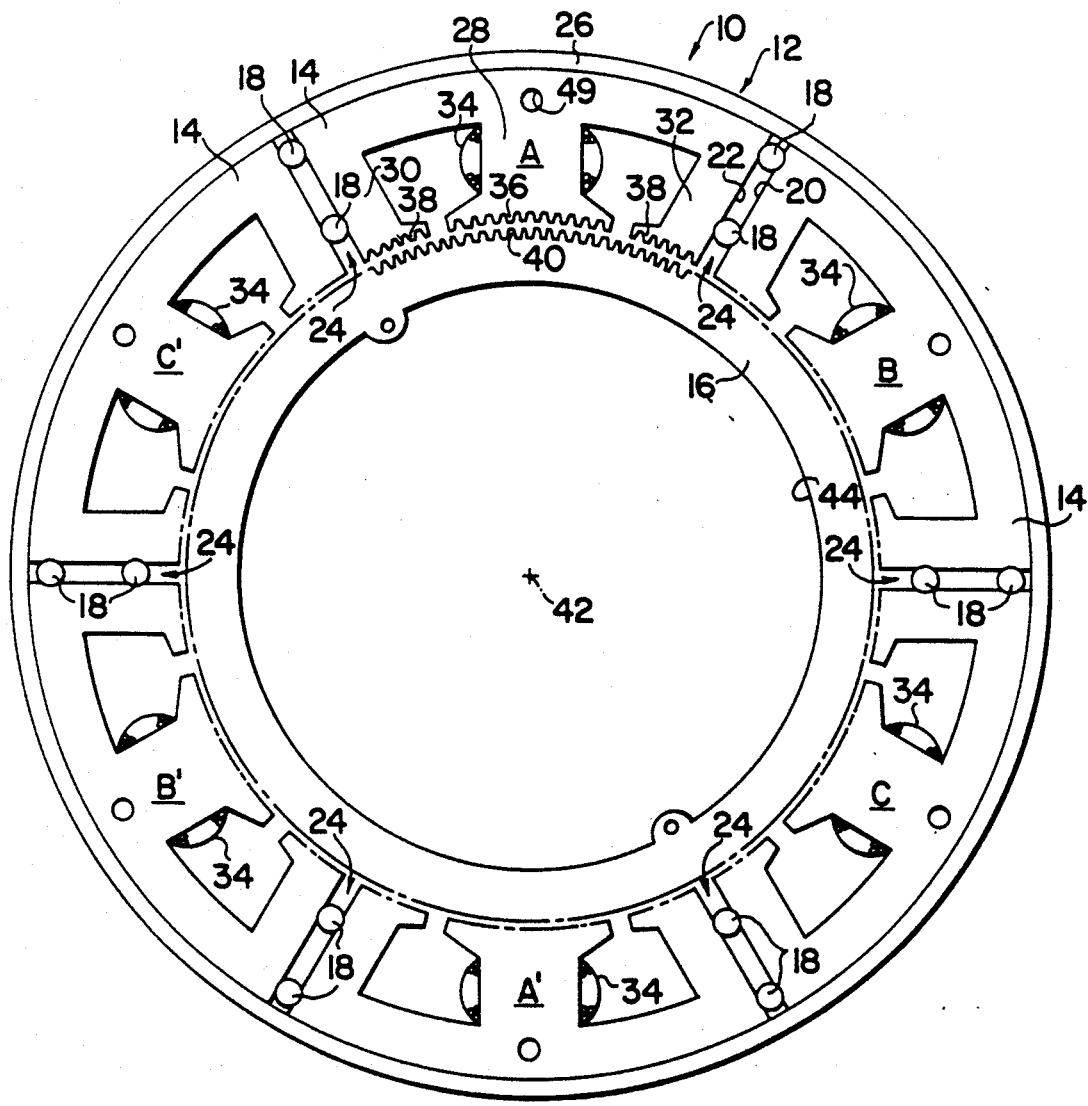
FIG. 1 is an end view of a three-phase embodiment of a variable reluctance motor embodying the present invention.

Referring now to the drawings and considering FIG. 1 inparticular, the present invention is illustrated by way of example as a variable reluctance motor 10. The motor 10 includes a cylindrical stator assembly 12 comprised of a number of stator segments 14,14 circumaxially arranged about a rotor 16 which is supported for rotation relative to the stator assembly 12 and about an axis of rotation 42. Although the present invention is disclosed as a rotary motor, the principles of the invention are applicable to linear motors also.

Each stator segment 14 is comprised of a number of laminations and includes a salient winding pole member 28 and two salient non-winding pole members 30,32 disposed laterally and in a spaced apart relation at opposite sides of the winding pole member. Each of the winding pole members 28 includes a winding 34 around it.

Each winding pole member 28 includes teeth 36 and each non-winding pole member 30,32 include teeth 38. The number of teeth 36 on the winding pole member 28 is equal to the sum of the teeth 38 on the non-winding pole members 30 and 32. The rotor 16 acts as the variable reluctance member and includes teeth 40 which are circumferentially arranged with respect to teeth 36,38. The rotor 16 rotates in a stepwise manner about the axis of rotation 42 when the windings 34,34 are sequentially energized. The rotor 16 further includes a large central opening 44 extending axially therethrough to prevent flux leakage across the rotor and to further reduce the mass of the motor. Although the rotor 16 is illustrated inwardly of the pole members, it will be understood that the pole members may extend radially outwardly and the rotor may be outward of the pole members.

Non-magnetic pins or dowels 18,18 are received within and coact between facing side portions 20,22 of immediately adjacent stator segments 14,14 and form a radially inwardly projecting, continuous non-magnetic channel indicated generally 24 between adjacent stator segments. Each channel 24,24 extends fully from the outer circumference to the inner circumference of the stator assembly 12 to essentially magnetically isolate each stator segment from one another. The magnetic isolation between stator segments prevents flux produced in one stator segment from leaking into and substracting from the magnetic flux produced in another adjacent stator segment with the result that there is no reduction in torque for a given magnitude current supplied.

A generally annular non-magnetic shell 26 coaxially surrounds and engages the outer periphery of the stator segments 14,14 to cause a compressive force to be directed radially inwardly to maintain the stator segments comprising the stator assembly 12 in a cylindrical and precisely aligned arrangement.

The pins 18,18 and shell 26 may be, of any suitable non-magnetic material. The rotor and stator may be of any suitable magnetic material. Due to the unique, completely magnetically isolated arrangement of the stator segments, an anisotropic or grain oriented magnetic material may be used for the stator assembly for increased permeability and lower flux loss. The use of a grain oriented magnetic material results in improved efficiency and accordingly, a higher torque for a given magnitude current supplied to the motor windings.

In the three-phase embodiment of the variable reluctance motor of FIG. 1, the winding pole members 28,28 are grouped into three phases A, B and C each containing two winding pole members, for example, A and A', and are spaced 180° from one another. The winding pole members 28,28 of each phase A, B and C are separated from one another by a winding pole member of each of the other three phases. The windings 34,34 are excited in a predetermined manner such that the windings around the pole members 28,28 of the same phase are excited simultaneously. For further details relating to the general operation of a variable reluctance motor, reference may be had to U.S. Pat. No. 3,984,711 identified above and the disclosure of which patent is incorporated herein by reference.

In the illustrated embodiment, the rotor 16 includes 160 teeth which have a constant pitch and are spaced 2.25 mechanical degrees apart from one another about the circumference of the rotor. The teeth 36 of a winding pole member 28 and the teeth 38 of a non-winding pole member 30,32 of each stator segment 14 have a constant pitch and are also spaced 2.25 mechanical degrees apart from one another. Accordingly, the teeth of oppositely disposed stator segments are maintained in the same mechanical relationship so that the teeth 40 of the rotor 16 can be aligned with the teeth 36,38 of the pole members associated with stator segments having the same phase, for example, A and A'.

The relationship between the teeth 40 and the teeth 36,38 are such that the teeth of the pole members associated with an immediately adjacent stator segment are shifted one third tooth or 120 electrical degrees.

Figure 2:
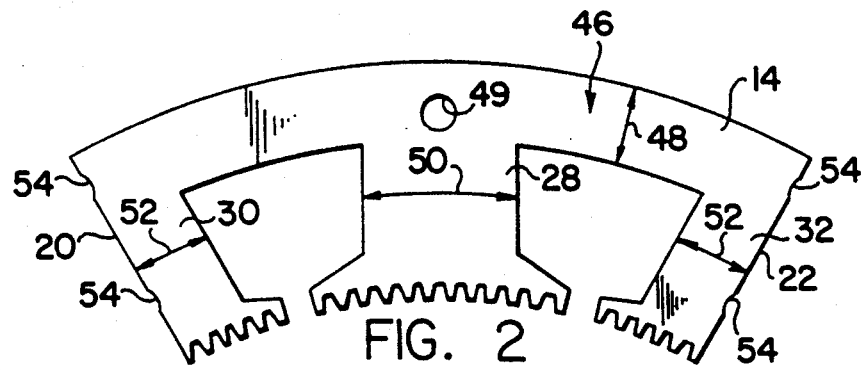
FIG. 2 is an end view of a stator segment of the variable reluctance motor of FIG. 1.

Turning now to FIG. 2, a stator segment 14 is shown therein. The laminations of a stator segment are made using a conventional stamping process to stamp the stator segment and the pole teeth as one structure. Because the stator is assembled from individual segments, each stator segment is substantially smaller in area than the stator assembly itself. Consequently, the stamping die is much smaller than a stamping die necessary to stamp a stator lamination of a conventional design. Accordingly, die costs are reduced and there is also an attendant saving of material. In addition, each lamination has a "dimple" stamped partially into the surface and a number of laminations are stacked as interlocking laminations to produce a desired stator assembly size.

Each of the stator segments 14 is stamped with spaced apart concavities 54,54 in each face 20,22 respectively of the stator segment. During the construction and alignment of the stator segments 14,14 into the cylindrical stator assembly 12, the concavities 54,54 are slightly reamed and trued to insure that the non-magnetic spacing pins 18,18 are precisely positioned and engaged with the surfaces of the concavities to prevent shifting or movement of the stator segments.

The back iron area of each stator segment 14 is designated generally 46 and has a width 48 which is one-half the width 50 of the winding pole member 28. The non-winding pole members 30,32 have a width 52 which is equal to the width 48 of the back iron 46. The relationship of the width of the back iron 46 and the winding and non-winding pole members is further explained in conjunction with the flux path description in the discussion of FIG. 3.

Figure 3:
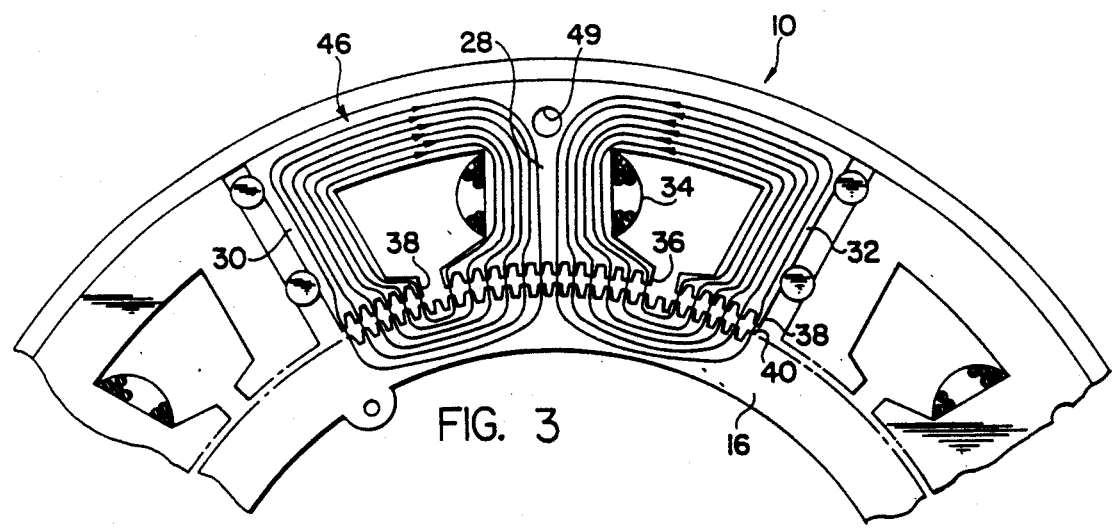
FIG. 3 is a schematic representation of the flux path and tooth relationship between the rotor and stator pole members in the variable reluctance motor of FIG. 1 and as illustrated for a single stator segment.

Turning now to FIG. 3, a partial view of the variable reluctance motor 10 is shown. The magnetic flux produced in the winding pole member 28 by the excitation of the winding 34 splits as illustrated with one-half the flux following a series path comprising the teeth 36 of the winding pole member 28, the aligned teeth 40 of the rotor 16, the teeth 38 of the non-winding pole member 32, across the back iron area 46 of the stator segment 14 between pole member 32 and pole member 28 and back to the pole member 28. In a similar manner, the other half of the flux produced in the winding pole member 28 follows a series path comprising the teeth 36 of the winding pole member 28, the aligned teeth 40 of the rotor 16, the teeth 38 of the non-winding pole member 30 across the back iron area 46 between pole member 30 and pole member 28 and back to the pole member 28. Accordingly, it is seen that the width of the non-winding pole members 30 and 32 and the width of the back iron area 46 and also the width of the rotor 16 need only be one-half the width of the winding pole member 28 because only one-half the total flux produced is carried in these sections. In addition, since the stator segments are magnetically isolated from adjacent stator segments, flux does not leak from one stator segment to another stator segment further reducing the flux carrying capacity to the maximum flux produced in a stator segment's associated winding pole member.

Figure 4:
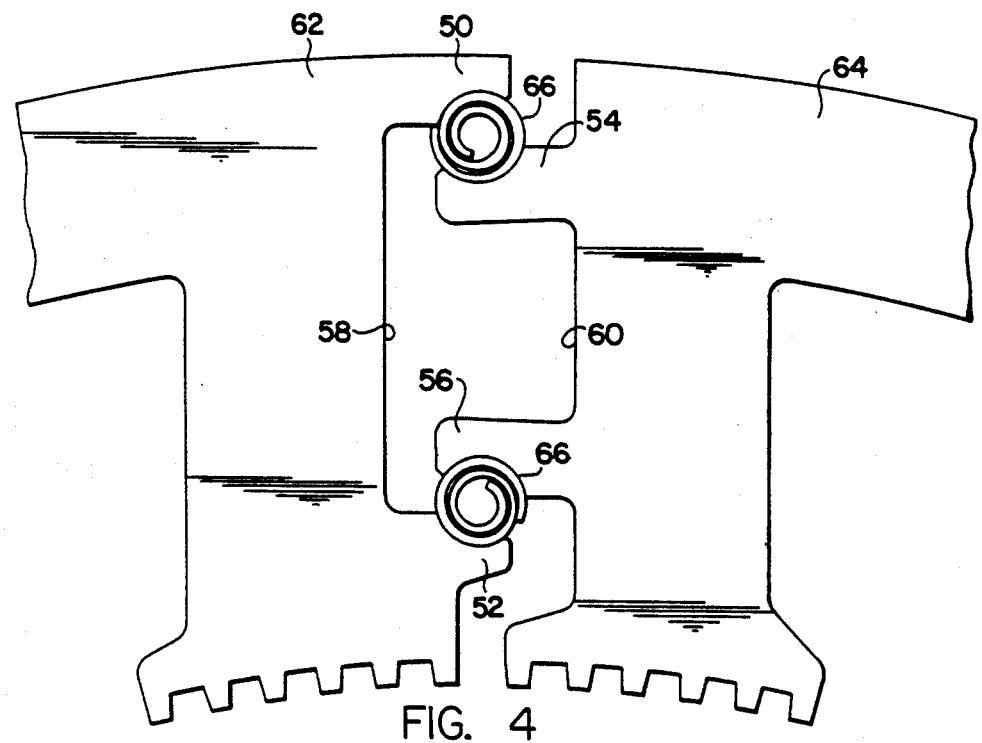
FIG. 4 is a fragmentary end view schematically illustrating the interlocking complementary tab configuration for maintaining the stator segments in a precisely aligned and spaced-apart relation with one another.

Turning now to FIG. 4, interlocking complementary tabs 50,52 and 53,56 extend from face 58 of stator segment 62 and face 60 of stator segment 64, respectively. Non-magnetic pins or dowels 66,66 are inserted into holes formed by the alignment of the tabs. Epoxy or other suitable non-magnetic adhesive material may be used in the channel formed between the faces 58 and 60 to maintain the essentially magnetically isolated spacing between stator segments.

A variable reluctance high torque-to-mass ratio motor has been described in a preferred embodiment. It will be understood that numerous modifications and substitutions may be made without departing from the spirit of the invention. For example, the stator segments comprising the cylindrical stator assembly may be made with holes 49 in the back iron area for receiving elongated rods that extend through non-magnetic end rings and the stator segments. The rods may be threaded to receive a nut at each end which nut can be turned to shorten the length of the rod and accordingly to sandwich and hold the stator assembly between the end rings. Therefore, the invention has been described by way of illustration rather than limitation.

We claim:
1. A variable reluctance motor, comprising:
a rotor supported for rotation about an axis of rotation;
a cylindrical stator assembly means having a plurality of independent stator segments circumaxially arranged about said axis of rotor rotation, each of said independent stator segments including one first and two second salient pole members, said two second pole members being in spaced relation with and disposed at opposite sides of said first pole member, said first pole member having a pole face and a first plurality of teeth on said pole face, each of said second pole members having a pole face and a second plurality of teeth on said pole face;
non-magnetic spacing means located between adjacent ones of said independent stator segments for maintaining said adjacent independent stator segments in a spaced apart and non-contacting relationship with one another, said spaced apart relationship of said stator segments creating a plurality of radially inwardly projecting channels disposed around the periphery of said stator assembly means with each of said channels extending fully from the outer circumference to the inner circumference of said stator assembly means to essentially magnetically isolate and completely physically isolate said independent stator segments from one another and with one second pole of one independent stator segment and one second pole of an adjacent independent stator segment being located on opposite sides of each channel, and
a plurality of electrically energizable windings disposed one for one on said first pole members of said plurality of independent stator segments;
said rotor including a variable reluctance member coaxial with said axis of rotor rotation and having a third plurality of teeth for coaction with said teeth of said first and second pole members.

2. A variable reluctance motor as defined in claim 1 wherein said axis of rotor rotation is located radially inwardly of said first and second pole members and said third plurality of teeth extend radially outwardly from said axis.

3. A variable reluctance motor as defined in claim 1 further including a generally annular biasing member coaxially surrounding and engaging the periphery of said plurality of independent stator segments comprising said stator assembly, said biasing member exerting a compressive force in a radially inwardly direction to maintain said independent stator segments in said cylindrical arrangement, said biasing member being made of a non-magnetic material.

4. A variable reluctance motor as defined in claim 1 wherein said non-magnetic spacing means comprises a plurality of axially elongated pins and each of said independent stator segments having outwardly facing surfaces and forming one side of a said channel, each of said outwardly facing surfaces having means for receiving said pins, said receiving means on one face on one side of a said channel coacting with receiving means on one face on the opposite side of said channel.

5. A variable reluctance motor as defined in claim 1 wherein said third plurality of teeth are circumferentially positioned with respect to said first and second plurality of teeth.

6. A variable reluctance motor as defined in claim 3 wherein said biasing member is a shell.

7. A variable reluctance motor as defined in claim 4 wherein said pin receiving means comprises a plurality of concavities in a spaced apart relation on each of said outwardly facing surfaces, said pins being received by said concavities disposed on opposite sides of each of said channels.

8. A variable reluctance motor as defined in claim 7 wherein said pin receiving means comprises a plurality of complementary interlocking tabs located in spaced relation to one another on each of said outwardly facing surfaces, said tabs on one side of a said channel cooperating with said tabs on the opposite side of a said channel to receive said pins to maintain adjacent independent stator segments in a spaced-apart and non-contacting relationship with one another.

9. A variable reluctance motor as defined in claim 1 wherein each of said second pole members has a width equal to one-half the width of said first pole member.

10. A variable reluctance motor, comprising:
a rotor supported for rotation about an axis of rotation;
a cylindrical stator assembly means having a plurality of independent stator segments circumaxially arranged about said axis of rotor rotation, each of said independent stator segments including one first and two second salient pole members, said two second pole members being in spaced relation with and disposed at opposite sides of said first pole member, said first pole member having a pole face and a first plurality of teeth on said pole face, each of said second pole members having a pole face and a second plurality of teeth on said pole face;
non-magnetic spacing means located between adjacent ones of said independent stator segments for maintaining said adjacent independent stator segments in a spaced apart and non-contacting relationship with one another, said spaced apart relationship of said stator segments creating a plurality of radially inwardly projecting channels disposed around the periphery of said stator assembly means with each of said channels extending fully from the outer circumference to the inner circumference of said stator assembly means to essentially magnetically isolate and completely physically isolate said independent stator segments from one another and with one second pole of one independent stator segment and one second pole of an adjacent independent stator segment being located on opposite sides of each channel, and
a plurality of electrically energizable windings disposed one for one on one of said first pole or said second pole members of said plurality of independent stator segments;
said rotor including a variable reluctance member coaxial with said axis of rotor rotation and having a third plurality of teeth for coaction with said teeth of said first and second pole members.

11. A variable reluctance motor, comprising:
a rotor supported for rotation about an axis of rotation;
a cylindrical stator assembly means having a plurality of independent stator segments circumaxially arranged about said axis of rotor rotation, each of said independent stator segments including one first and two second salient pole members, said two second pole members being in spaced relation with and disposed at opposite sides of said first pole member, said first pole member having a pole face and a first plurality of teeth on said pole face, each of said second pole members having a pole face and a second plurality of teeth on said pole face each of said second pole members having a width equal to one-half the width of said first pole member, said rotor having a width substantially equal to said width of said second pole member;
non-magnetic spacing means located between adjacent ones of said independent stator segments for maintaining said adjacent independent stator segments in a spaced apart and non-contacting relationship with one another, said spaced apart relationship of said stator segments creating a plurality of radially inwardly projecting channels disposed around the periphery of said stator assembly means with each of said channels extending fully from the outer circumference to the inner circumference of said stator assembly means to essentially magnetically isolate and completely physically isolate said independent stator segments from one another and with one second pole of one independent stator segment and one second pole of an adjacent independent stator segment being located on opposite sides of each channel, and
a plurality of electrically energizable windings disposed one for one on one of said first pole members of said plurality of independent stator segments;
said rotor including a variable reluctance member coaxial with said axis of rotor rotation and located radially inwardly of said first and second pole members and having a third plurality of teeth extending radially outwardly for coaction with said teeth of said first pole members, said third plurality of teeth circumferentially positioned with said first and second plurality of teeth;
said independent stator segments being made of a grain oriented magnetic material.

12. A variable reluctance motor as defined in claim 11 further including a cylindrical shell coaxially surrounding and engaging the periphery of said plurality of independent stator segments comprising said stator assembly, said shell exerting a compressive force in a radially inwardly direction to maintain said independent stator segments in said cylindrical arrangement, said shell being made of a non-magnetic material.

13. A variable reluctance motor as defined in claim 12 wherein said non-magnetic spacing means comprises a plurality of axially elongated pins and each of said independent stator segments having outwardly facing surfaces and forming one side of a said channel, each of said outwardly facing surfaces having a plurality of spaced apart concavities, said pins being received by said concavities disposed on opposite sides of each of said channels.

* * * * *